(12) United States Patent
Brauer

(10) Patent No.: US 12,504,419 B2
(45) Date of Patent: Dec. 23, 2025

(54) APPARATUS, SYSTEMS AND METHOD FOR MONITORING A PIECE OF ELECTRICAL EQUIPMENT

(71) Applicant: MORGAN SCHAFFER LTD., LaSalle (CA)

(72) Inventor: Stephan Brauer, Westmount (CA)

(73) Assignee: MORGAN SCHAFFER LTD., LaSalle (CA)

( * ) Notice: Subject to any disclaimer, the term of this patent is extended or adjusted under 35 U.S.C. 154(b) by 300 days.

(21) Appl. No.: 18/319,978

(22) Filed: May 18, 2023

(65) Prior Publication Data
US 2024/0385166 A1    Nov. 21, 2024

(51) Int. Cl.
*G01N 33/28* (2006.01)
*G06N 5/022* (2023.01)

(52) U.S. Cl.
CPC ......... *G01N 33/2841* (2013.01); *G06N 5/022* (2013.01)

(58) Field of Classification Search
CPC .................................................. G01N 33/2841
See application file for complete search history.

(56) References Cited

U.S. PATENT DOCUMENTS

| | | | |
|---|---|---|---|
| 5,395,042 | A | 3/1995 | Riley et al. |
| 6,494,617 | B1 | 12/2002 | Stokes et al. |
| 6,526,805 | B1 | 3/2003 | Babes-Dornea et al. |
| 7,001,505 | B2 | 2/2006 | Hersh |
| 7,170,395 | B2 | 1/2007 | Crenshaw et al. |
| 7,319,280 | B1 | 1/2008 | Landry et al. |

(Continued)

FOREIGN PATENT DOCUMENTS

| | | |
|---|---|---|
| CA | 2725522 | 9/2010 |
| CA | 2695672 | 5/2016 |

(Continued)

OTHER PUBLICATIONS

Machine translation of KR 20220102723 (Year: 2022).*

*Primary Examiner* — Nathaniel J Kolb
(74) *Attorney, Agent, or Firm* — Sheridan Ross P.C.

(57) ABSTRACT

A monitoring system for a piece of electrical equipment having components immersed in electrical insulating liquid, associated methods and uses thereof are described. The monitoring system includes alert threshold determination capabilities. The monitoring system may comprise: an analysis system configured for obtaining measurements conveying concentrations of dissolved molecular species in the electrical insulating liquid; and a processing system programmed for: processing the measurements conveying concentrations of dissolved molecular species and one or more alert thresholds to determine if a predetermined condition corresponding to the one or more alert thresholds is met; causing an alert event in response to the predetermined condition being met; and performing a threshold adjustment determination process to derive new values for the one or more alert thresholds at least in part by processing historical measurements of concentrations of dissolved molecular species. Alternate embodiments may make use of an artificial intelligence engine trained using historical concentration measurements to process the measurements conveying concentrations of dissolved molecular species to adjust alarm thresholds.

37 Claims, 9 Drawing Sheets

(56) References Cited

U.S. PATENT DOCUMENTS

| | | |
|---|---|---|
| 7,333,003 B1 | 2/2008 | Landry et al. |
| 7,356,086 B1 | 4/2008 | Landry et al. |
| 7,362,097 B2 | 4/2008 | Brown et al. |
| D569,279 S | 5/2008 | Krebs et al. |
| RE40,492 E | 9/2008 | Grimes et al. |
| 7,442,343 B2 | 10/2008 | Salisbury et al. |
| 7,747,417 B2 | 6/2010 | Lamontagne |
| 7,977,588 B2 | 7/2011 | Chandler |
| 8,707,767 B2 | 4/2014 | Herz et al. |
| 8,839,658 B2 | 9/2014 | Herz et al. |
| 9,176,107 B2 | 11/2015 | Jeffrey et al. |
| 9,395,252 B1 | 7/2016 | Frounfelker et al. |
| 9,419,430 B1 | 8/2016 | Tostrud et al. |
| 9,915,640 B2 | 3/2018 | Pruente et al. |
| 10,365,209 B1 | 7/2019 | Beaudoin et al. |
| 10,488,384 B2 * | 11/2019 | Desai .................... G01R 31/62 |
| 10,495,622 B2 | 12/2019 | Robinson et al. |
| 10,564,660 B2 | 2/2020 | Sobieski et al. |
| 10,622,808 B2 | 4/2020 | Li et al. |
| 10,670,564 B2 | 6/2020 | Voinea |
| 10,690,643 B2 | 6/2020 | Fenton |
| 10,732,164 B2 | 8/2020 | Berler et al. |
| 11,064,595 B2 | 7/2021 | Pozsgay et al. |
| 11,137,382 B2 | 10/2021 | Brauer et al. |
| 11,280,724 B2 | 3/2022 | Brauer et al. |
| 11,300,602 B1 | 4/2022 | Kuppuswamy |
| 11,592,434 B2 | 2/2023 | Brauer et al. |
| 2008/0099570 A1 | 5/2008 | Krebs et al. |
| 2009/0301879 A1 | 12/2009 | Soundarrajan et al. |
| 2011/0175623 A1 | 7/2011 | Shrinet et al. |
| 2017/0054923 A1 | 2/2017 | Thompson |
| 2019/0325668 A1 | 10/2019 | Cole et al. |
| 2021/0270797 A1 * | 9/2021 | Cheim ............... G01N 33/2841 |
| 2022/0128539 A1 | 4/2022 | Harris et al. |
| 2022/0326212 A1 * | 10/2022 | Potyrailo ............. G01N 27/221 |

FOREIGN PATENT DOCUMENTS

| | | | |
|---|---|---|---|
| CA | 3089773 | 4/2021 | |
| CA | 3011985 | 8/2021 | |
| KR | 20220102723 A * | 7/2022 | ............ G06Q 50/10 |
| WO | WO 2006/009973 | 1/2006 | |
| WO | WO 2006/093771 | 9/2006 | |
| WO | WO 2006/093772 | 9/2006 | |
| WO | WO 2006/093773 | 9/2006 | |

* cited by examiner

Compiling measurement conveying concentrations of dissolved molecular species in the electrical insulating liquid to obtain historical measurements of concentrations of dissolved molecular species, each historical measurements of concentrations being specific to a different one of the pieces of electrical equipment 4
40

Performing, using the processing system 300, the threshold adjustment determination process 29 to derive new values for the alert thresholds 250 independently for each piece of electrical equipment 4
42

In response to the new values for the alert thresholds 250 being derived, performing at least one of: adapting the alert thresholds 250 without human intervention; and presenting the derived new values for the alarm thresholds 250 on the display device associated to a human operator
44

FIG. 5

APPARATUS, SYSTEMS AND METHOD FOR MONITORING A PIECE OF ELECTRICAL EQUIPMENT

TECHNICAL FIELD

This disclosure generally relates to the field of apparatuses, systems and methods for monitoring a piece of electrical equipment having components immersed in an electrical insulating liquid and to methods, devices and computer-readable media for setting and/or adjusting alert thresholds in such apparatuses and systems.

BACKGROUND

There are various commercially available devices and methods for detecting and obtaining concentration measurements of dissolved molecular species in a liquid, such as an electrical insulating liquid. These monitors vary significantly by their design and even by their basic operating principles depending on the manufacturer. For example, some monitors may use optics-based methods, using infrared (IR) light, chromatographic methods such as gas chromatography, thermal-based methods, using thermal conductivity sensors, electronical-based methods, using electrochemical sensors, amongst potential others.

These monitors can be used for different applications. Typical applications for these devices include measuring and monitoring dissolved molecular species (such as gases and/or moisture) in the electrical insulating liquids of electrical transformers. In some cases, this may be referred-to as dissolved gas analysis (DGA). Practical examples of such devices are described in U.S. Pat. Nos. 10,365,209, 10,670,564, 11,137,382, 11,280,724 and 11,592,434, the contents of which are hereby incorporated herein by reference.

In some applications, the measurements obtained corresponding to the dissolved molecular species (such as gases and/or moisture) in the electrical insulating liquid may be used to determine whether a potentially problematic and/or dangerous situation is developing in the electrical transformer. Generally, such determination may be made by comparing derived gas concentrations and/or moisture levels, and/or rates-of-change in these, against various limits or thresholds and communicating an alert when such a comparison indicates a potential problem, for example when such threshold limits are exceeded.

A complicating factor in establishing effective alert thresholds is that each piece of electrical equipment is unique. For example, the concentrations of dissolved molecular species can vary widely between transformers, even among those operating under normal and safe conditions. This makes it difficult to establish general guidelines or policies for setting alert thresholds. In the absence of such guidelines or policies, some users leave in place the default alert thresholds provided by the monitor manufacturer, which are generally meant just as examples of alert thresholds and are not optimized to any specific transformer.

Desirable alert thresholds are those that seek to provide the earliest possible notification that the measured concentrations have evolved in a manner indicative of the emergence or evolution of a fault in the transformer, without providing nuisance notifications for changes in the concentration measurements that are likely inconsequential, for example due to noise in the measurements. Current approaches for setting alarm thresholds are highly dependent on the professional skill and judgment of the technician that installed and/or is operating of the monitoring equipment. Given the high level of variability in professional skill, the alert thresholds are commonly poorly configured.

Poorly configured alert thresholds allow potentially problematic and/or dangerous situations associated with a monitored transformer to go undetected for longer than necessary, leading to potentially more serious transformer problems, more expensive repairs, irreparable damages, risks to human safety, and/or risks of power outages for those served by the transformer.

A deficiency associated with conventional monitors of molecular species in the electrical insulating liquids is that they do not provide a simple, reproducible, traceable way of setting alert thresholds.

Against the background described above, it is clear that there remains a need in the industry to provide improved processes and devices for monitoring a piece of electrical equipment having components immersed in an electrical insulating liquid configured for setting and/or adjusting alert thresholds in a manner that alleviate at least some of the deficiencies of the existing devices and methods.

SUMMARY

This summary is provided to introduce a selection of concepts in a simplified form that are further described below in the Detailed Description. This Summary is not intended to identify all key aspects and/or essential aspects of the claimed subject matter.

In accordance with some various aspects of this disclosure, systems, apparatuses, and methods are presented to provide solutions for simplifying the case-by-base setting of alert thresholds in devices for monitoring a piece of electrical equipment having components immersed in an electrical insulating liquid.

In accordance with some other various aspects, an objective of the disclosure is to provide a system and method for providing a simple, reproducible and/or traceable approach to setting alert thresholds for a device for monitoring a piece of electrical equipment having components immersed in an electrical insulating liquid is provided. Advantageously, such method may be incorporated as part of a corporate policy for setting alarm thresholds, simplifying the process of setting the alert thresholds.

In accordance with some specific aspect of this disclosure, a monitoring system for a piece of electrical equipment having components immersed in electrical insulating liquid is provided. The monitoring system includes alert threshold determination capabilities. The monitoring system comprises: an analysis system configured for obtaining measurements conveying concentrations of dissolved molecular species in the electrical insulating liquid; and a processing system. The processing system is programmed for: processing the measurements conveying concentrations of dissolved molecular species and one or more alert thresholds to determine if a predetermined condition corresponding to the one or more alert thresholds is met; causing an alert event in response to the predetermined condition being met; and performing a threshold adjustment determination process to derive new values for the one or more alert thresholds at least in part by processing historical measurements of concentrations of dissolved molecular species.

In some implementations, the piece of electrical equipment may be a transformer and the electrical insulating liquid may be comprised of liquids based on at least one of mineral oil, silicone, natural ester and synthetic ester.

In some implementations, the historical measurements may be obtained over a prescribed time period and/or include a prescribed number of data points.

In some implementations, the processing system may be further programmed for, in response to the new values being derived, adjusting the one or more alert thresholds without human intervention at least in part using the new values for the one or more alert thresholds.

In alternate implementations, the processing system may be further programmed for, in response to the new values being derived, presenting the new values for the one or more alert thresholds on a display device associated to a human operator, the new values being presented as suggested adjustments to be made to the one or more alert thresholds.

In some implementations, the analysis system may comprise an extraction system configured for extracting samples from the electrical insulating liquid. For instance, in a specific example, the extraction system may be a gas extraction system and the samples may be gas samples. In such implementations, the analysis system may comprise a measurement system configured to obtain the measurements from the samples.

In some implementations, the measurements may be optical absorption measurements, and the measurement system is an optical absorption measurement system configured to use one or more electromagnetic energy sources to obtain the optical absorption measurements. In some specific implementations, the measurement system may be at least one of: a chromatography measurement system, a thermal conductivity measurement system, a fluorescence measurement system, an electrochemical measurement system, a measurement system comprising a at least one metal film element wherein the electrical resistance of the element varies with gas concentration, and relative saturation measurement system for dissolved moisture. In some specific implementations, the dissolved molecular species may comprise one or more specific dissolved gases, and the concentrations are respective dissolved gas concentrations of the one or more specific gases. For instance, each of the one or more specific dissolved gases may include at least one of: H2, CO, CH4, C2H2, C2H4, C2H6, CO2, O2, and N2.

In some implementations, the dissolved molecular species may comprise dissolved $H_2O$ (water).

In some implementations, the one or more alert thresholds may be associated with a specific one of the dissolved molecular species; and the processing system may be programmed to derive the new values at least in part by processing the historical measurements of the specific one of the dissolved molecular species.

In some implementations, the one or more alert thresholds may be associated with specific ones (two or more) of the dissolved molecular species; and the processing system may be programmed to derive the new values at least in part by processing the historical measurements of the specific ones (two or more) of the dissolved molecular species.

In some implementations, the one or more alert thresholds may convey a specific concentration level corresponding to a specific dissolved molecular species. Alternatively, or in addition, the one or more alert thresholds may convey a specific rate of change of a concentration level.

In some implementations, the one or more alert thresholds may be associated with an alert level and or may convey the alert level. The alert level may be a single alert level or may instead be a first alert level amongst a set of two or more alert levels. Each alert level in the set of two or more alert levels may correspond to a distinct level of severity/risk associated with the piece of equipment being monitored. In such implementations, one or more respective alert thresholds may correspond to each alert level in the set of alert levels and, for each alert level in the set of alert levels, the processing system may be programmed for performing the threshold adjustment determination process as described herein.

In some implementations, the historical measurements of the concentrations may include data covering different suitable time durations, for example 30 days or more.

In some implementations, the analysis system may be configured for obtaining the measurements periodically to obtain a sequence of measurements over time. For instance, in specific implementations, a time delay between two consecutive measurements may be at most 24 hours.

In some implementations, the predetermined condition may be determined to have been met when at least one of the measurements conveying concentrations of a specific dissolved molecular species (or derived from measurements of concentrations of dissolved molecular species) exceeds a corresponding alert threshold. In some other implementations, the predetermined condition may be determined to have been met when a consecutive number of measurements conveying concentrations of a specific dissolved molecular species (or derived from measurements of concentrations of dissolved molecular species) exceeds a corresponding alert threshold.

In some implementations, the predetermined condition is determined to have been met when at least one of the measurements conveying concentrations of a specific dissolved molecular species (or derived from measurements of concentrations of dissolved molecular species) exceeds a corresponding alert threshold consecutively for a predetermined period of time.

In some implementations, performing the threshold adjustment determination process to derive the new values for the one or more alert thresholds may include: processing a set of the historical measurements of the concentrations corresponding to a specific dissolved molecular species over the time period to derive an average concentration associated with the specific dissolved molecular species; and deriving a specific new value for a specific alert threshold corresponding to the specific dissolved molecular species, the specific new value being set to correspond to a weighted amount of the average concentration, the weighted amount being greater than the average concentration.

In some implementations, performing the threshold adjustment determination process to derive the new values for the one or more alert thresholds may include: processing a set of the historical measurements of the concentrations corresponding to a specific dissolved molecular species over the time period to derive an average concentration associated with the specific dissolved molecular species; deriving a specific new value for a specific alert threshold corresponding to the specific dissolved molecular species, the specific new value being set to exceed the derived average concentration corresponding to the specific dissolved molecular species by at least 10 ppm.

In some implementations, the processing system may be programmed for performing a suitability process to determine whether the historical measurements are suitable for performing the threshold adjustment determination process. The suitability process may include a number of subprocesses including, without being limited to: evaluating a number of historical measurements; evaluating a time period of the historical measurements; and evaluating a variability of the historical measurements.

In some implementations, the processing system may be programmed for periodically performing the threshold adjustment determination process, for example on a weekly, monthly, quarterly, bi-annual or annual basis.

In some alternative implementations, the processing system may be programmed for performing the threshold adjustment determination process in response to receipt of a command provided through an input device by a user of the monitoring system.

In some practical implementations, causing the alert event may comprise conveying information to a communication device associated with a user, the information conveying at least one of: (i) an alert level; (ii) an identification of the one or more thresholds that were exceeded; and (iii) the at least some of the measurements that exceed the one or more alert thresholds.

In some practical implementations, the processing system may include a trained artificial intelligence engine configured for processing the historical measurements of concentrations of dissolved molecular species to derive the new values for the one or more alert thresholds.

In accordance with another aspect, a method is provided for determining alert threshold adjustments for a monitoring system for a piece of electrical equipment having components immersed in electrical insulating liquid is provided. The monitoring system is configured for obtaining measurements conveying concentrations of dissolved molecular species in the electrical insulating liquid. The monitoring system is configured for causing an alert event in response to a predetermined condition being met. The method comprises: compiling the measurements conveying concentrations of dissolved molecular species in the electrical insulating liquid to obtain historical measurements of concentrations of dissolved molecular species. The method further comprises: performing a threshold adjustment determination process to derive new values for the one or more alert thresholds corresponding to the alert level, the threshold adjustment determination process being performed at least in part by: processing the historical measurements of concentrations; and using results of the processing to derive the new values for the one or more alert thresholds. The method further comprises: in response to the new values for the one or more alert thresholds being derived, performing at least one of the following: adapting the one or more alert thresholds without human intervention at least in part using the derived new values for the one or more alert thresholds; and presenting the derived new values for the one or more alert thresholds on a display device associated to a human operator, the new values being presented as suggested adjustments to be made to the one or more alert thresholds.

In some implementations, the method may further comprise presenting on the display device associated to the human operator information conveying at least part of the historical measurements of concentrations obtained by the monitoring system.

In some implementations, processing the historical measurements of concentrations and using results of the processing to derive the new values for the one or more alert thresholds may include: processing a set of historical measurements of concentrations corresponding to a specific dissolved molecular species to derive an average concentration corresponding to the specific dissolved molecular species; and deriving a specific new value for a specific alert threshold corresponding to the specific dissolved molecular species, the specific new value being set to correspond to a weighted amount of the derived average concentration corresponding to the specific dissolved molecular species, the weighted amount being greater than the derived average concentration.

In some alternative implementations, processing the historical measurements of concentrations and using results of the processing to derive the new values for the one or more alert thresholds may include: processing a set of historical measurements of concentrations corresponding to a specific dissolved molecular species over the time period to derive an average concentration corresponding to the specific dissolved molecular species; and deriving a specific new value for a specific alert threshold corresponding to the specific dissolved molecular species, the specific new value being set to exceed the derived average concentration corresponding to the specific dissolved molecular species by at least 10 ppm.

In some implementations, the method may further comprise periodically performing the threshold adjustment determination process, the threshold adjustment determination process being performed at least once per year, preferably at least twice a year, more preferably at least once a quarter, more preferably at least once a week or more often. In addition, or alternatively, the method may further comprise performing the threshold adjustment determination process in response to receipt of a command provided through an input device by a user.

In some practical implementations, performing the threshold adjustment determination may include using a trained artificial intelligence engine for processing the historical measurements of concentrations of dissolved molecular species to derive the new values for the one or more alert thresholds.

In accordance with another aspect, a computer-readable media comprising program instructions is provided, the instructions being configured to be executed by one or more processors of a processing system to implement the method as described herein.

In accordance with another aspect, a computer-readable media comprising program instructions is provided. The instructions are configured to be executed by one or more processors of a processing system for performing a threshold adjustment determination process and for adjusting alert thresholds at least in part based on historical concentration measurements in an electrical insulating liquid of a piece of electrical equipment.

In accordance with another aspect, an electrical substation is provided. The electrical substation comprises: a plurality of pieces of electrical equipment having components immersed in electrical insulating liquid, the plurality of pieces of electrical equipment including two or more pieces of electrical equipment, each piece of electrical equipment having an analysis system connected thereto configured for obtaining measurements conveying concentrations of dissolved molecular species in the electrical insulating liquid; and a processing system in communication with the plurality of pieces of electrical equipment. The processing system is configured for: processing the measurements conveying concentrations of dissolved molecular species and one or more alert thresholds to determine if a predetermined condition corresponding to the one or more alert thresholds is met; causing an alert event in response to the predetermined condition being met; and performing a threshold adjustment determination process to derive new values for the one or more alert thresholds corresponding to the alert level for each piece of electrical equipment independently, the threshold adjustment determination process being performed at least in part by processing historical measurements of concentrations in the electrical insulating liquid for each piece of electrical equipment independently.

In accordance with another aspect, a computer-readable media comprising program instructions is provided. The instructions are configured to be executed by one or more processors of a processing system for performing a threshold adjustment determination process and for adjusting alert thresholds for one or more pieces of electrical equipment independently, at least in part based on respective historical concentration measurements in an electrical insulating liquid of the pieces of electrical equipment.

In accordance with another aspect, a method is provided for training an artificial intelligence engine for determining alert threshold adjustments for a specific monitoring system for a specific piece of electrical equipment having components immersed in electrical insulating liquid, the monitoring system being configured for obtaining measurements conveying concentrations of dissolved molecular species in the electrical insulating liquid, the monitoring system being configured for causing an alert event in response to a predetermined condition being met. The method comprises:
  compiling historical measurements of concentrations of dissolved molecular species for at least one of:
    the specific piece of electrical equipment;
    a set of pieces of electrical equipment similar to the specific piece of electrical equipment;
  compiling health outcomes associated with the historical measurements of concentrations of dissolved molecular species and classifying the health outcomes compiled based on distinct levels of severity;
  training the artificial intelligence engine using the historical measurements of concentrations of dissolved molecular species and the classified health outcomes;
  releasing the trained artificial intelligence engine for use in determining alert threshold adjustments for the monitoring system.

In accordance with some implementations, at least some of the health outcomes associated with the historical measurements of concentrations of dissolved molecular species may correspond to malfunctions of the specific piece of electrical equipment or pieces of electrical equipment in the set of pieces of electrical equipment.

The historical measurements of concentrations and associated health outcomes used to train the artificial intelligence engine may vary between implementations and may be modulated in accordance with the availability of suitable training data. For example, in some implementations, the specific piece of electrical equipment and each piece of electrical equipment in the set of pieces of electrical equipment may be of a same equipment type. For example, they may all be transformers, all be tap-changers or all be circuit breakers, In some implementations, both the specific piece of electrical equipment and the pieces of electrical equipment in the set of pieces of electrical equipment may be of a same equipment type and may share one or more, or all, of the following characteristics:
  a. model number;
  b. manufacturer;
  c. year of manufacture;
  d. type of equipment core;
  e. type of winding;
  f. field of use; and/or
  g. insulating liquid type.

In some implementations, the compiled historical measurements of concentrations of dissolved molecular species for pieces of electrical equipment in the set of pieces of electrical equipment may be obtained from a set of monitoring systems similar to the monitoring system for the specific piece of electrical equipment. For example, the monitoring systems in the set of monitoring systems and the monitoring system for the specific piece of electrical equipment may all be of the same type, for example all may use similar technology to derive measurements of gas concentrations. In some implementations, monitoring systems in the set of monitoring systems and the monitoring system for the specific piece of electrical equipment may also share one or more of the following characteristics:
  a. model number;
  b. manufacturer; and/or
  c. field of use.

In some implementations, the processing system may be further programmed for performing a threshold adjustment determination process to adapt the artificial intelligence engine at least in part by processing historical measurements of concentrations of dissolved molecular species obtained from the specific piece of electrical equipment.

All features of exemplary embodiments which are described in this disclosure and are not mutually exclusive can be combined with one another. Elements of one embodiment or aspect can be utilized in the other embodiments/aspects without further mention.

These and other aspects of this disclosure will now become apparent to those of ordinary skill in the art upon review of a description of embodiments that follow in conjunction with accompanying drawings.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which:

FIG. 5 is a flow diagram of a method for determining alert threshold adjustments for the monitoring system shown in FIG. 1 in accordance with another non-limiting embodiment of the disclosure;

Figure 1:
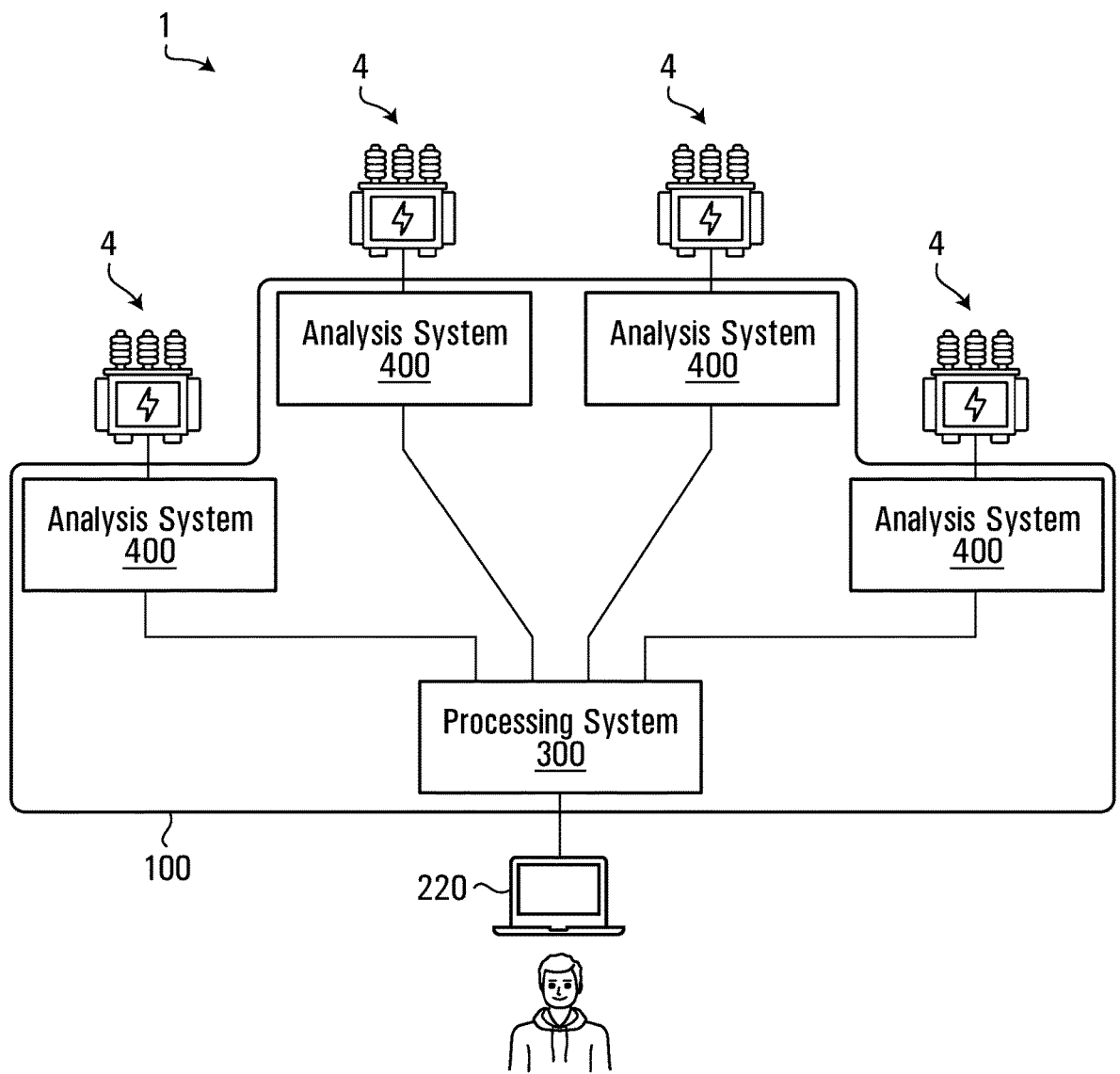
FIG. 1 is a schematic illustration of an electrical substation comprising pieces of electrical equipment, and a monitoring system for the pieces of electrical equipment including a processing system in accordance with a non-limiting embodiment of the disclosure.

In the drawings, embodiments are illustrated by way of example. It is to be expressly understood that the description and drawings are only for purposes of illustrating certain embodiments and are an aid for understanding. They are not intended to be a definition of the limits of the disclosure.

DETAILED DESCRIPTION OF EMBODIMENTS

A detailed description of one or more specific embodiments of the disclosure is provided below along with accompanying Figures that illustrate principles of the disclosure. The disclosure is described in connection with such embodiments, but the disclosure is not limited to any specific embodiment. Numerous specific details are set forth in the following description in order to provide a thorough understanding of the disclosure. These details are provided for the purpose of describing non-limiting examples and the disclosure may be practiced according to the claims without some or all of these specific details. For the purpose of clarity, technical material that is known in the technical fields related to the disclosure has not been described in great detail so that the disclosure is not unnecessarily obscured. The approach described in the present document may be applied for providing alert threshold setting functionalities and/or for improving monitoring capabilities to a wide variety of monitoring systems for pieces of electrical equipment having components immersed in electrical insulating liquid, including but without being limited to those based on dissolved gas analysis (DGA).

For instance, non-limiting examples of analysis applications may include dissolved gas analysis (DGA) applications, and more specifically DGA applications using optical absorption measurements, and in particular Infrared (IR) absorption spectroscopy measurements, for detecting/measuring concentrations of one or more specific gases that may be dissolved in electrical insulating liquid of that type that may be used for example in transformers, tap-changers and circuit breakers. It is to be appreciated that the concepts presented in the present document having regard to gas analysis using optical absorption spectroscopy measurements and the approach for providing threshold setting functionalities and/or for improving monitoring capabilities to devices used in performing DGA analysis may be used in other practical applications in which it is desirable to monitor gas concentrations.

One practical application includes detecting/diagnosing faults in electrical substations 1 comprising one or more pieces of electrical equipment 4 and monitoring system 100 for monitoring these one or pieces of electrical equipment 4. As further discussed below, the methods presented in the present document provide alert threshold determination and setting functionalities and allow compensating for changes attributable to particularities of a specific piece of electric equipment 4.

Electrical Substation 1

FIG. 1 shows an example of implementation of an electrical substation 1 comprising one or more pieces of electrical equipment 4 having components immersed in electrical insulating liquid.

The probability of a fault developing in any one of the pieces of electrical equipment 4 may depend on a wide range of factors including, but not limited to, their design, manufacturing, transportation, installation, loading, maintenance, and environmental factors.

In this embodiment, the electrical substation 1 includes a monitoring system 100 for the pieces of electrical equipment 4 including alert threshold determination capabilities as will now be described.

Monitoring System 100

In this embodiment, a monitoring system 100 for the pieces of electrical equipment 4 including alert threshold determination capabilities and improved monitoring capabilities is provided. The monitoring system 100 is configured for: obtaining measurements conveying concentrations of dissolved molecular species in liquid, such as an electrical insulating liquid for example, such as electrical insulating liquids based on at least one of mineral oil, silicone, natural ester and synthetic ester for example; processing the obtained measurements conveying concentrations of dissolved molecular species and one or more alert thresholds to determine if a predetermined condition corresponding to the measurements and the one or more alert thresholds is met; and causing an alert event in response to the predetermined condition being met. The monitoring system 100 is also configured for performing a threshold adjustment determination process to derive new values for the one or more alert thresholds at least in part by processing historical measurements of concentrations of dissolved molecular species, as will be described below.

In the embodiment depicted in FIG. 1, the monitoring system 100 comprises one or more analysis systems 400 configured for obtaining measurements conveying concentrations of dissolved molecular species in the electrical insulating liquid of the one or more pieces of electrical equipment 4, and a processing system 300 programmed for processing the measurements conveying concentrations of dissolved molecular species. In the embodiment depicted, each piece of electrical equipment 4 is equipped with a dedicated analysis system 400. It is however to be appreciated that, in alternative implementations not shown in the figures, an analysis system 400 may be shared amongst two or more pieces of electronical equipment so that the analysis system 400 is alternately used to obtain measurements conveying concentrations of dissolved molecular species for different pieces of electronical equipment.

In some embodiments, the analysis systems 400 may include, for example, one or more dissolved gas analysis (DGA) apparatuses, and the dissolved molecular species comprise one or more specific dissolved gases and/or dissolved $H_2O$. For instance, each of the one or more specific dissolved gases may include at least one of: $H_2$, CO, $CH_4$, $C_2H_2$, $C_2H_4$, $C_2H_6$, $CO_2$, $O_2$, and $N_2$.

In the example depicted, each analysis system 400 may include a housing which encloses various elements for performing dissolved gas analysis on the piece of electrical equipment 4. The housing can be made of any suitable material including but not limited to plastic, metal or a composite.

In a specific practical implementation, the analysis system 400 can be embodied in a housing of a compact size dimensions and weight such that the analysis system 400 can be used as a portable apparatus connectable to a piece of electrical equipment 4 when a DGA operation is desired. In another specific practical implementation, the analysis system 400 is configured to be a fixed/stationary device, which is connected to the piece of electrical equipment 4 and can be left connected to the piece of electrical equipment 4 for an extended period of time. In such cases, the housing of the analysis system 400 may be configured to be securely mountable upon a supporting surface, such as a wall or frame, for example by providing suitable mounting elements and/or suitable fasteners on the housing to facilitate such mounting.

In specific practical examples, the analysis system 400 may include a liquid inlet and a liquid outlet connectable to the piece of electrical equipment 4 for allowing samples of the electrical insulating liquid to circulate between the piece of electrical equipment 4 and the analysis system 400 over a liquid circulation path, which transfers insulating liquid in and out of the analysis system 400. In this embodiment, the analysis system 400 is configured for obtaining measurements conveying concentrations of dissolved molecular species in the electrical insulating liquid of the piece of electrical equipment 4. For instance, to achieve this, the analysis system 400 may be configured for performing gas analysis on gas samples extracted from the liquid.

The analysis systems 400 may be configured to use various processes/technologies for obtaining measurements of dissolved molecular species (such as gases and/or moisture) in the electrical insulating liquid of electrical transformers. In some cases, this may be referred-to as dissolved gas analysis (DGA). Specific examples of such devices are described in U.S. Pat. Nos. 10,365,209, 10,670,564, 11,137, 382, 11,280,724 and 11,592,434, the contents of which are hereby incorporated herein by reference. It is to be appreciated that in various embodiments, the analysis systems 400 may make use of any suitable processes for obtaining measurements of dissolved molecular species. Many of such processes are known in the art and will not be described further here.

In some practical examples of implementations, the analysis systems 400 may be embodied to include one or more of the Calisto R9™, the Calisto 9™ DGA monitor, Calisto T1™ condition monitoring system and Calisto H1™ hydrogen sensor for transformers, wherein these products are being commercialized by Morgan Schaffer Ltd./Doble, an ESCO Technologies Company.

As depicted in the embodiment shown in FIG. 1, the one or more analysers 400 are in communication with the processing system 300. The processing system 300 may include one or more processing units programmed for processing the measurements conveying concentrations of dissolved molecular species obtained by the analysers 400 in combination with one or more alert thresholds to determine if a predetermined condition corresponding to the one or more alert thresholds is met. In response to a specific and to predetermined condition being met, the processing system 300 is configured to cause an alert event.

The one or more processing units of processing system 300 are also programmed to perform a threshold adjustment determination process to derive new values for the one or more alert thresholds at least in part by processing historical measurements of concentrations of dissolved molecular species obtained by the analysis system 400 so that alert thresholds may be adapted to a piece of electrical equipment and/or over time. In the embodiment depicted, a single processing system 300 is shared between multiple pieces of electrical equipment 4 and multiple analysis systems 400. It is however to be appreciated that, in alternative implementations not shown in the figures, each analysis system 400 and/or each piece of electrical equipment 4 may have a dedicated processing system 300 used to determine if a predetermined condition has been met and/or to perform a threshold adjustment determination process to derive new values for the one or more alert thresholds at least in part by processing historical measurements.

In practical embodiments, the alert event may take on various forms. In the embodiment depicted, the processing system 300 is in communication with a user input/output device 220 that may be configured to release signals causing information conveying current and/or historical measurements of concentrations of dissolved molecular species to be displayed on a display device, for example. In some practical implementations, executing the alert event may comprise presenting information using the user input/output device 220 conveying at least one of: (i) an alert level; (ii) an identification of the one or more thresholds that were exceeded; and (iii) an identification of the one or more measurements that exceeded the one or more alert thresholds. The alert event may include conveying information in a visual manner, using suitable visual elements of the user input/output device 220 including a display screen, a set of lighting elements (e.g., light-emitting diodes (LEDs)) or any other suitable element that may used to visually convey information to a human operator. Alternatively, or in addition, the alert event may include conveying information in an acoustic manner, for example using suitable acoustic elements of the user input/output device 220, such as for example a speaker to generate various audio signals having different acoustic propertied including frequency, intensity and the likes. Alternatively, or in addition, the alert event may include conveying information in a tactile manner, for example using suitable tactile elements of the user input/output device 220 to convey information through haptic feedback. It is to be appreciated that the alert event may include conveying information to a user using a combination visual, acoustic and haptic information and that the specific type of alert event may be further modulated based on the alert level and/or the specific one or more thresholds that were exceeded. Various specific forms for the alert event will become apparent to the person skilled in the art in light of the present disclosure. The specific forms are beyond the scope of the present disclosure and will therefore not be described in further detail here.

It will be apparent to the reader that, while the processing system 300, the analysis system 400 and the user input/output device 220 have been depicted in FIG. 1 as separate physical components, in alternative implementations, various combinations and functionalities of these components may be combined into a same physical processing assembly. For example, the processing system 300 and the analysis system 400 may be embodied on a same physical processing assembly including suitable hardware and/or software components for obtaining measurements conveying concentrations of dissolved molecular species in the electrical insulating liquid, for causing an alert event when it is determined that a predetermined condition corresponding to one or more alert thresholds is met and for performing a threshold adjustment determination process to derive new values for the one or more alert thresholds. It is also to be appreciated that portions of the functionality of the processing system 300 may be embodied on a same physical processing assembly as that of the analysis system 400 while others may be embodied in physically separate hardware. . . . The input/output device 220 processing system 300 may also be integrated into the same physical component as the analysis system 400 and/or the processing system 300. Alternatively, the display device and/or display elements may reside in a computing device located remotely from the analysis system 400/or the processing system 300, wherein the computing device is in communication with the analysis system 400 and/or/or the processing system 300 over a data communication link.

In yet another alternative implementation, the processing system 300 may instead be embodied, in whole or in part, on a processing assembly including suitable hardware and/or software components located remotely from the analysis system 400. In such embodiment, the processing system 300 may be in communication with to the analysis system 400 over a short-range wireless connection and/or over a private or public (Internet) computer network. In such cases, it will become apparent to the person of skill in the art that the monitoring system 100 would be equipped with suitable network interface hardware and software for establishing communications between the various components 400 300 and 220 of the monitoring system 100.

In some practical implementations, some of the operations performed by the analysis system 400 and/or some or all the operations performed by the processing system 300 may be performed on a cloud platform. Cloud computing has, amongst other, the advantage of allowing the specific processes (including the software) used to derive useful information to be modified and/or upgrades as well as new functionality to be introduced in one centralized location and thus without requiring access to the analysis system 400 and/or the processing system.

Analysis System 400

In this embodiment, the analysis system 400 is configured for performing a dissolved gas analysis (DGA) process on the piece of electrical equipment 4 having components immersed in electrical insulating liquid for obtaining measurements conveying concentrations of dissolved molecular species in the electrical insulating liquid.

The specific calculation/modeling approaches used in different implementations of the analysis system 400 may differ and will depend on a number of factors which may include, without being limited to, the configuration of the components of the optical measurement system and the specific target molecular species whose concentration information is being measured. Specific suitable calculation/ modeling approaches that may be used in practical implementations will become apparent to the person skilled in the art in view of the present description and as such will not be described in further detail here.

In some embodiments, the concentrations of the specific dissolved molecular species may be reported in "parts per million" by volume (ppm) at a given temperature and pressure, commonly 0 degrees Celsius and 14.6 PSIA. For example, in a practical implementation, the analysis system 400 may be configured to detect/quantify one or more of dissolved gas concentrations of at least 2 ppm CO (e.g., 2-50,000 ppm); at least 20 ppm $CO_2$ (e.g., 20-50,000 ppm); at least 2 ppm $CH_4$ (2-50,000 ppm); at least 0.5 ppm $C_2H_2$ (e.g., 0.5-50,000 ppm); at least 2 ppm $C_2H_6$ (e.g., 2-50,000 ppm); at least 2 ppm $C_2H_4$ (e.g., 2-50,000 ppm).

The analysis system 400 may be configured for obtaining the measurements conveying concentrations of specific dissolved molecular species (e.g., by performing DGA) periodically to obtain a sequence of measurements over time. For instance, in some embodiments, a time delay between two consecutive measurements of a same specific dissolved molecular species may be at most 48 hours, in some embodiments at most 24 hours, in some embodiments at most 12 hours, in some embodiments at most 6 hours, in some embodiments at most 1 hour, in some embodiments at most 30 min., and in some embodiments even less (e.g., at most 15 minutes). Alternatively, or in addition, the processing system 300 may be configured to generate and transmit to the analysis systems 400 a control command to cause the analysis systems 400 to obtain measurements conveying concentrations of specific dissolved molecular species, and the analysis systems 400 may be configured to perform the analysis in response to receiving the command.

The measurements conveying concentrations of dissolved molecular species in the electrical insulating liquid obtained by the analysis system 400 are then provided to the processing system 300.

Processing System 300

The processing system 300 is in communication with each of the analysis systems 400 and is configured to process output signals released by the analysis systems 400 including measurements conveying concentrations of dissolved molecular species in the electrical insulating liquid to derive information associated with dissolved gas concentrations and/or to derive information conveying a fault status (or alternatively a fault level ranking). This may include, for instance, detecting faults, triggering alerts, establishing a connection with a communication device, etc. The processing system 300 may also be configured to generate and transmit input signals to the analysis systems 400. This may include, for instance, commands to perform an analysis, etc.

Figure 2:
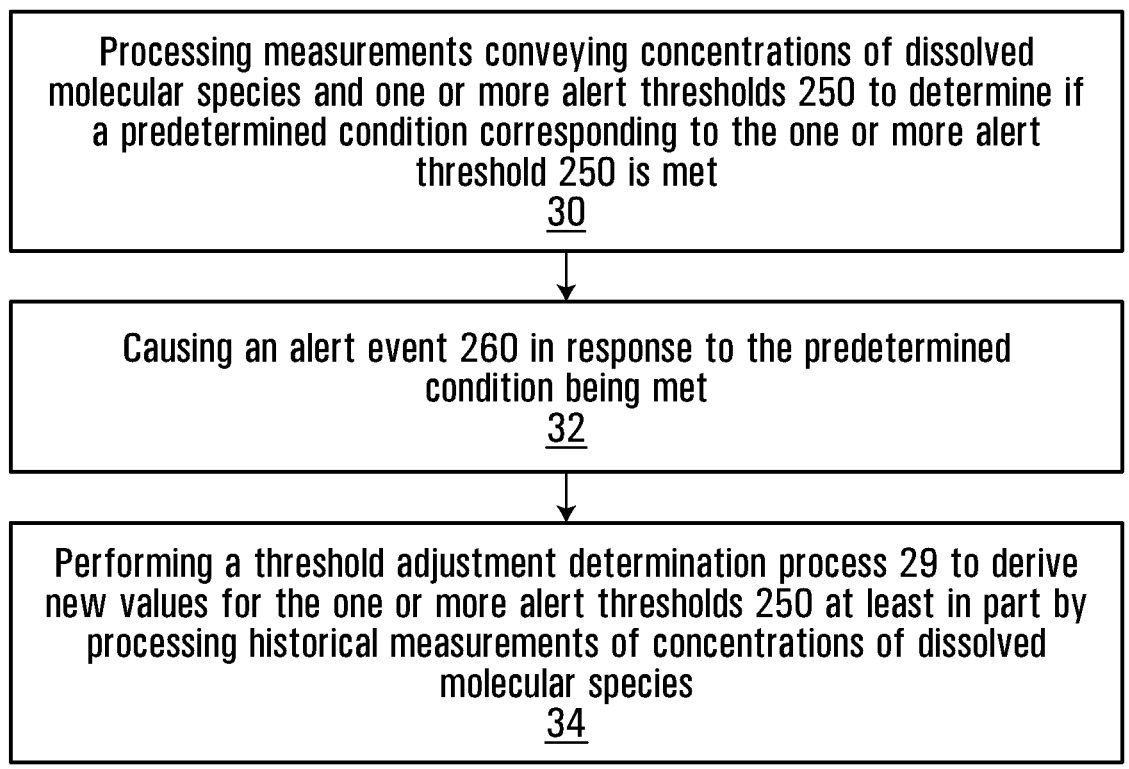
FIG. 2 is a flow diagram of steps performed by the processing system of the monitoring system shown in FIG. 1.
Figure 3:
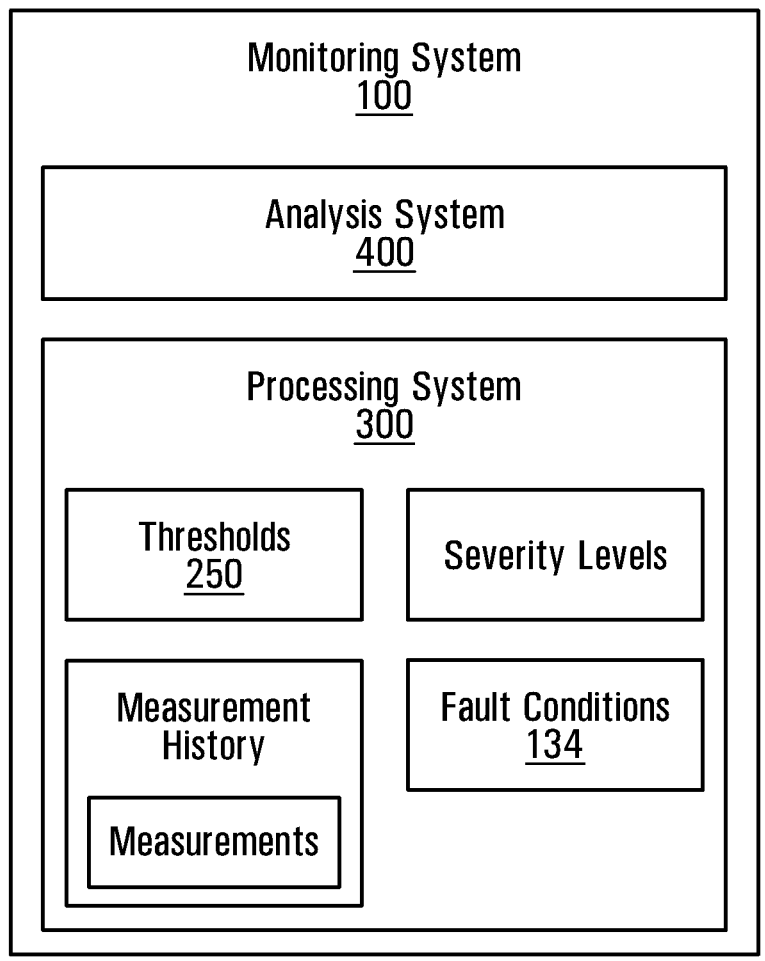
FIG. 3 is a functional block diagram of the monitoring system shown in FIG. 1.

FIG. 2 of the drawings is a flow diagram showing steps performed by the processing system 300 of the monitoring system 100 in accordance with a specific implementation. More specifically, in this embodiment, the processing system 300 is programmed to achieve this by comparing the measurements obtained by the analysis systems 400 against one or more thresholds 250. For instance, as depicted, at step 32, the processing system 300 is configured for processing the measurements conveying concentrations of dissolved molecular species received from the analysis system 400 and one or more alert thresholds stored in memory to determine if a predetermined condition corresponding the one or more alert thresholds (e.g., at least one of the measurements being above a threshold 250, a rate of change of at least one of the measurements being above a threshold 250, a ratio of measurements being above or below a threshold 250, etc.) is met. At step 32, if the predetermined condition is determined at step 30 to have been met, in response the processing system 300 is programmed for causing an alert event 260. As described earlier in the present disclosure, the alert event may include conveying information to a user including one or more of visual, acoustic and haptic information and the specific type of alert event may be further modulated based on the alert level and/or the specific one or more thresholds that were exceeded and/or the nature of the predetermined condition determined to have been met.

In some cases, at least one of (i.e., one of, many of, a majority of or all of) the alert thresholds 250 may convey a specific concentration level corresponding to a specific dissolved molecular species, such as a concentration level corresponding to a specific gas species. Alternatively, or in addition, at least one of the thresholds 250 may convey a specific rate of change of a concentration level of a specific molecular species. Alternatively, or in addition, at least one of the thresholds 250 may convey concentration levels of a group including two or more different molecular species. In such cases, the threshold may be presented as a weighted average of concentration levels of these different molecular species and/or, a specific ratio of concentration levels of different molecular species, for example.

In practical examples of implementation, each of the thresholds 250 may in turn be associated with a fault condition and/or an alert level based on one or more fault conditions 134 stored in a data memory of the processing system 300. As such, each threshold 250 may be associated with an alert level and the alert event 260 caused by the processing system 300 may be representative of the fault condition and/or alert level corresponding to the threshold 250 that was exceeded by one or more measurements obtained by the analysis system 400. For instance, in some embodiments, different thresholds 250 (e.g., a first threshold 250 and a second threshold 250) may be associated with different fault conditions and/or alert levels, and the alert events 260 caused by one or more measurements obtained by the analysis system 400 exceeding the different thresholds 250 may be different and/or representative of the different fault conditions and/or alert levels (e.g., by conveying different alert levels, by displaying different messages, by being conveyed to different users and/or authorities, by causing different reactions, etc.).

At step 34, the processing system 300 is programmed for performing a threshold adjustment determination process 29 to derive new values for the alert thresholds 250. The threshold adjustment determination process 29 is performed at least in part by processing historical measurements of concentrations of one ore more dissolved molecular species received from the analysis system 400 to derive new values for the alert thresholds 250. The new values for the alert thresholds 250 may be based on a number of factors including trend information conveyed by the historical measurements and rate of change information amongst others.

It is to be appreciated that, while in FIG. 2, step 34 is shown as following steps 30 and 32, this is not necessarily the case in some practical implementations. In alternate implementations, step 34 may precede steps 30 and 32 and/or may generally be performed independently of steps 30 and 32, for example as a process parallel to that of steps 30 and 32. Moreover, step 34 may be performed at a different frequency than that at which steps 30 and 32 are performed, either more frequently or less frequently in some cases.

The type and extent of the historical measurements used may vary in various practical implementations. For example, in some embodiments, the historical measurements may include a prescribed number of data points, which may be of any suitable size, wherein each data point is obtained at a different moment in time. For instance, in some embodiments, the historical measurements for one ore more dissolved molecular species may include includes at least 5 data points, in some embodiments at least 10 data points, in some embodiments at least 20 data points, and in some embodiments even more. In some practical embodiments, the historical measurements for one ore more dissolved molecular species may even include hundreds or thousands of data points. In some embodiments, the prescribed number of data points may be pre-set by the manufacturer of the processing system 300 and/or may be specific by a user operator via the user input/output device 220 (shown in FIG. 1). In other embodiments, the prescribed number of data points may be adjustable and may be dynamically set by the processing system 300 based on various criteria. In some very specific implementations, the prescribed number of data points may be modulated based on a rate of change of the historical measurements for a specific dissolved molecular species so that the number of data points used increases for historical measurements exhibiting higher rates of change. In some very specific implementations, the frequency at which the analysis system 400 (shown in FIG. 1) takes measurements may also (or instead) be modulated based on a rate of change of the historical measurements for one or more specific dissolved molecular species so that the measurement frequency is increased when historical measurements for one or more specific dissolved molecular species exhibit rates of change exceeding one or more rate of change thresholds. Similarly, the measurement frequency may be increased if one or more of the alert thresholds is exceeded.

Alternatively, or in addition, the historical measurements may be obtained over a prescribed time period, which may be of any suitable duration, the measurements for at least one specific dissolved molecular species being obtained at different moments in time over the prescribed time period. For instance, in some embodiments, the historical measurements for one or more dissolved molecular species may include data covering at least 1 day, in some embodiments at least 15 days, in some embodiments at least 1 month, in some embodiments at least 3 months, in some embodiments at least 6 month, in some embodiments at least 1 year, and in some embodiments even longer periods of time (e.g., at least 2 years). In some embodiments, the prescribed time period may be pre-set by the manufacturer of the processing system 300 and/or may be specific by a user operator via the user input/output device 220 (shown in FIG. 1). In other embodiments, the prescribed time period may be adjustable and may be dynamically set by the processing system 300 based on various criteria. In a very specific implementation, the prescribed time period may be modulated based on a rate of change of the historical measurements for a specific dissolved molecular species so that the duration of the time period decreases for historical measurements exhibiting higher rates of change.

In some embodiments, the processing system 300 may be configured for performing the threshold adjustment determination process 29 for setting the alert threshold 250 at least partly based on the historical measurements of concentrations of a single one of the specific dissolved molecular species. In other embodiments, the processing system 300 may be configured for performing the threshold adjustment determination process 29 for setting the threshold 250 at least partly based on the historical measurements of concentrations of a combination of two or more specific dissolved molecular species.

In specific practical implementations, the threshold adjustment determination process 29 may be performed independently for each of the different pieces of electric equipment 4 (shown in FIG. 1) by processing historical measurements of concentrations of dissolved molecular species for each respective piece of equipment 4 so that each piece of electric equipment 4 is associated with its own set of alert thresholds.

In practical examples of implementations, each threshold 250 used by the processing system 30 may be set on the basis of different specific criteria. In some embodiments, the criteria used to set the alarm thresholds may be pre-set by the manufacturer of the processing system 300 and/or may be specified by a user operator via the user input/output device 220 (shown in FIG. 1). For instance, in some embodiments, setting an alert threshold corresponding to a specific dissolved molecular species may including using the processing system 300 to process a set of the historical measurements of the concentrations corresponding to the specific dissolved molecular species (e.g. either a prescribed number of data points and/or over a prescribed time period) to derive an average of the concentration measurements and/or a standard variation of the concentration measurements. Following this, the processing system 300 may be programmed to derive a new value for the alert threshold at least in part by processing the average of the concentration measurements and/or the standard variation of the concentration measurements. In some implementations, specific new values for specific alert thresholds 250 corresponding to the specific dissolved molecular species may be set to correspond to a weighted amount of the average concentration, the weighted amount being greater than the average concentration. For example, in some embodiments, the alert threshold 250 corresponding to a specific dissolved molecular species may be set to be at least 5%, in some embodiments at least 10% and in some embodiments at least 20% and in some embodiments even more, above the average of the historical measurements of the specific dissolved molecular species. Alternatively, in some embodiments, the alert threshold 250 corresponding to a specific dissolved molecular species may be set to be at least 5 ppm, in some embodiments at least 10 ppm, in some embodiments at least 20 ppm, and in some embodiments even more above the average of the historical measurements of the specific dissolved molecular specie. Alternatively, in some embodiments the alert threshold 250 corresponding to a specific dissolved molecular species may be set to be at least 2 times a standard deviation, in some embodiments at least 4 times a standard deviation, in some embodiments at least 5 times a standard deviation, in some embodiments at least 6 times a standard deviation, and in some embodiments even more, above the average of the historical measurements of the specific dissolved molecular species.

The predetermined conditions for causing the alert events may be of different types. For example, in some embodiments, at least some of (i.e., some of, a majority of, or all of) the predetermined conditions include at least one of the measurements exceeding one of the alert thresholds 250. In some embodiments, at least some of the predetermined conditions include a predetermined consecutive number of measurements exceeding one of the alert thresholds 250. In some embodiments, at least some of the predetermined conditions include an average of the measurements taken over a predetermined period of time exceeding one of the alert thresholds 250. In some embodiments, an assessment of whether a predetermined condition has been met may be performed by using a trained artificial intelligence (AI) engine. For example, in some embodiments, the processing system 300 may be configured to implement the AI engine and the AI engine, by processing historical measurements of concentrations of dissolved molecular species and respective health outcomes, may be trained to detect and/or predict malfunctions of the pieces of electrical equipment 4. In this example, at least some of the predetermined conditions correspond to a malfunction of the pieces of electrical equipment 4.

In some embodiments, the new values for the alert thresholds 250 may be set by the artificial intelligence (AI) engine in a manner that concurrently predicts potential malfunctions of the pieces of electrical equipment 4 and reduces false positives (e.g., alert events when there is no malfunction of the pieces of electrical equipment 4).

In some embodiments, the processing system 300 may be programed for performing a suitability process to determine whether the historical measurements are suitable for performing the threshold adjustment determination process 29. For instance, in some embodiments, the suitability process may include evaluating a number of historical measurements, evaluating a time period of the historical measurements, evaluating a variability of the historical measurements, etc. In some embodiments, when the suitability process results are indicative of the historical measurements being suitable for performing the threshold adjustment determination process 29, the processing system 300 may be configured to perform the threshold adjustment determination process 29 automatically and/or to communicate with a display device 220 associated with an authorized user to inform the authorized user that the threshold adjustment determination process 29 can be performed, as further discussed below. In some embodiments, when the suitability process results are indicative of the historical measurements being unsuitable for performing the threshold adjustment determination process 29, the processing system 300 may be prevented from performing the threshold adjustment determination process 29 and/or the processing system 300 may be configured to communicate with a display device 220 associated with an authorized user to inform the authorized user that the threshold adjustment determination process 29 cannot be performed.

In practical implementation, the criteria for evaluating the suitability of the historical measurements may vary. As a specific example, when evaluating suitability based on a number of historical measurements, the criteria applied may be whether a number of measurements has been obtained that meets or exceeds a minimum number of measurements. If too few measurements are available as part of the historical measurements, then the historical measurements will be considered unsuitable for the purpose of performing the threshold adjustment determination process 29. As another example, when evaluating suitability based on a time period of the historical measurements. the criteria applied may be whether a number of measurements has been obtained over a time period that has a duration that meets or exceeds a minimum duration. If measurements part of the historical measurements were obtained over a time duration that is shorter than the minimum duration, then the historical measurements will be considered unsuitable for the purpose of performing the threshold adjustment determination process 29. The person skilled in the art will appreciate that various alternative criteria may be used for evaluating the suitability of the of historical measurements and these will become apparent to the person skilled in the art in view of the present disclosure.

As depicted in FIG. 1, the processing system 300 is configured to communicate with the user input/output device 220. In practical implementations, the user input/output device 220 may be embodied in various hardware/software platforms. For example, user input/output device 220 may be a smartphone, a tablet, laptop or other personal computer, a smartwatch or other wearable device, or any other communication device carried (e.g., worn, held, or otherwise transported) by or otherwise associated with a user. The user input/output device 220 may include a user interface comprising one or more input elements (e.g., buttons, dials, keyboard, mouse, touch sensitive screen and/or other manual controls which may be physical and/or virtual, a microphone, a camera, etc.) configured to receive input (e.g., commands, information, etc.) from a user and one or more output elements (e.g., a display screen, a speaker, visual lighting elements (e.g. LEDs) etc.) configured to convey information to the user. In some embodiments, the user interface of the input/output device 220 may implement a graphical user interface (GUI) configured to graphically convey information) to and graphically receive inputs (e.g., commands, information, etc.) from the user via a display screen of the user input/output device 220.

Figure 6:
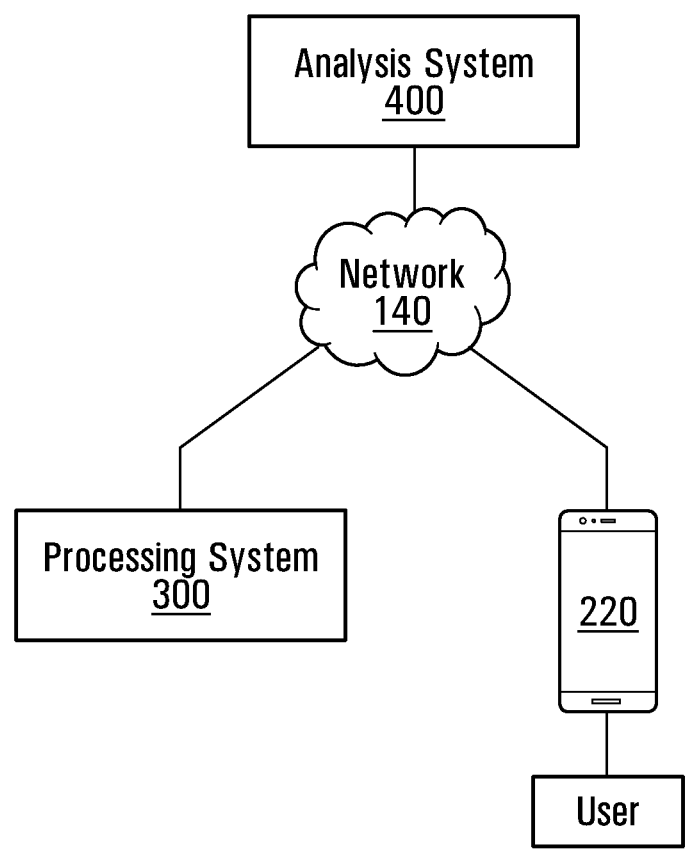
FIG. 6 is a block diagram illustrating communication between components of the monitoring system of FIG. 1 and a communication device of a user over a network according to a non-limiting embodiment.

The processing system 300 may be configured to communicate with the user input/output device 220 directly (as shown in FIG. 1) or, alternatively, through a data network 140, as depicted in FIG. 6. The network 140 may be a private or public network (e.g., the Internet, an intranet) and may be wired or wireless. Respective ones of the input/output device 220, the processing system 300 and the analysis system 440 can thus communicate with one another, i.e., receive and/or transmit information (e.g., data, signals, etc.) from and/or to one another, over the network 140. Each component 400 300 and 220 may be wireless, wired, and/or partly wireless and partly wired (e.g., Wi-Fi or other wireless LAN, WiMAX or other wireless WAN, cellular, satellite, Bluetooth or other short-range or near-field wireless connectivity, Universal Serial Bus (USB), etc.).

As described earlier, the input/output device 220 may be used to convey various types of information to a user of the monitoring system 100. For example, in some embodiments, the processing system 300 may be configured to convey current and/or historical measurements of concentrations of dissolved molecular species obtained by the analysis system 400 to a user via the input/output device 220.

As another example, in some embodiments, when causing the alert event, the processing system 300 may be configured to convey information via the input/output device 220 at least in part by processing one or both of: the threshold 250 and the measurements.

As mentioned above, the threshold adjustment determination process 29 may include receiving a signal indicative of a threshold setting from the input/output device 220 and setting the threshold 250 accordingly. More specifically in such an embodiment, the input/output device 220 may provide suitable input tools, such as a graphical user interface, configured for allowing a user to enter information for setting one or more of the thresholds 250. For example, the input/output device 220 may implement a GUI present user editable input fields for receiving a threshold setting command and/or value. In response to such threshold setting command and/or value, the input/output device 220 may be configured to communicate such information to the processing system.

As another example, in some embodiments, the processing system 300 may be programmed for, in response to new alert threshold values being derived, presenting the new alert threshold values to the user via the input/output device 220, the new alert threshold values being presented as suggested adjustments to be made to the alert thresholds 250. In this example, the processing system 300 may be further programmed for presenting to the user via the input/output device 220 information conveying at least some of the historical measurements of the concentrations, and for presenting the user with a user activable input using the GUI enabling the human operator to adjust the alert thresholds 250 at least in part by actuating the user activable input. In response to actuation of the user activable input using the GUI, the input/output device 220 is configured to convey the user input to the processing system 300 to trigger a threshold adjustment process and set a specific threshold value to the newly derived threshold value.

In some embodiments, the processing system 300 may be programmed for performing a threshold adjustment automatically and/or periodically. In particular, the processing system 300 may be programmed for performing a threshold adjustment in response to the new values being derived, adjusting the one or more alert thresholds without requiring human intervention. In such an embodiment, the processing system 300 is configured to dynamically adapt the threshold 250 based on the evolving historical measurements obtained by the analysis system 400. In a first example, the processing system 300 may be programmed for performing a threshold adjustment in response to the historical measurements meeting certain criteria. In some embodiments, the criteria may include, without being limited to, a time delay since a previous threshold adjustment, a magnitude of variation in the historical measurements, a number of historical measurements since a previous threshold adjustment, etc. For instance, in some embodiments, the processing system 300 be configured to perform a threshold adjustment at least one time per year, in some embodiments at least every 6 months, in some embodiments at least every 120 days, in some embodiments at least every 60 days, in some embodiments at least every 30 days, in some embodiments at least every 15 days, and in some embodiments even more frequently (e.g., at least every 7 days). In some embodiments, the criteria to determine whether a threshold adjustment should be performed may be pre-set by the manufacturer and/or by a user of the monitoring system 100 via input/output device 220. In other embodiments, the criteria may be dynamically adjustable and/or configurable by the processing system 300.

Figure 4:
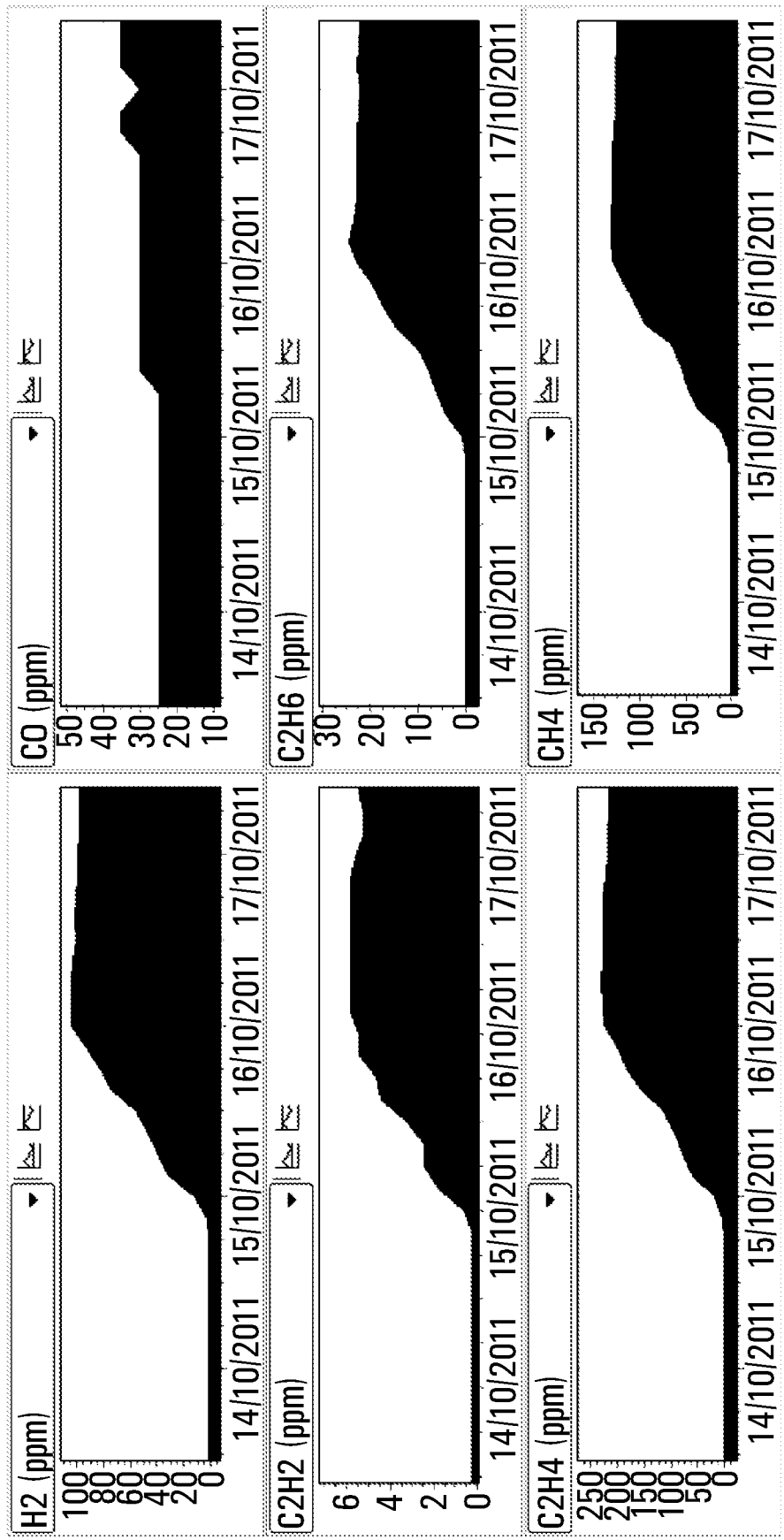
FIG. 4 are graphs showing historical measurements conveying concentrations of different dissolved molecular species in electrical insulating liquid of a piece of electrical equipment obtained by the monitoring system shown in FIG. 1.

FIG. 5 is a flow diagram of a method for determining alert threshold adjustments for the monitoring system 100 shown in FIG. 1 in accordance with a specific embodiment of the disclosure. In the embodiment depicted, the method, which is performed by the processing system 300, includes the following steps:

Step 40: compiling, using the processing system 300, the measurements conveying concentrations of dissolved molecular species in the electrical insulating liquid to obtain historical measurements of concentrations of dissolved molecular species. FIG. 4 of the drawings are graphs showing historical measurements conveying concentrations of different dissolved molecular species in electrical insulating liquid for a specific piece of electrical equipment 4 obtained by the monitoring system 100 shown in FIG. 1. Amongst the dissolved molecular species, included are $H_2$, $C_2H_2$, $C_2H_4$, CO; $C_2H_6$ and $CH_4$. If the processing system 300 received measurements from different piece of electrical equipment 4, then the historical measurements conveying concentrations of different dissolved molecular species are compiled separately for each piece of electrical equipment 4;

Step 42: performing, using the processing system 300, the threshold adjustment determination process 29 to derive new values for the alert thresholds 250, the threshold adjustment determination process being performed at least in part by:
  processing the historical measurements of dissolved molecular species; and
  using results of said processing to derive the new values for the alert thresholds 250.

If the processing system 300 receives measurements from different piece of electrical equipment 4, then the threshold adjustment determination process is performed separately for each piece of electrical equipment 4; and Step 44: in response to the new values for the alert thresholds 250 being derived, performing at least one of the following using the processing system 300:
  adapting the alert thresholds 250 without human intervention at least in part using the derived new values for the alert thresholds;
  presenting the derived new values for the alert thresholds 250 to a user via the input/output device 220, the new values being presented as suggested adjustments to be made to the alert thresholds 250.

In some embodiments, in addition to the above, the processing system 300 may be configured to perform the following steps:

1) Selecting historical measurements conveying concentrations of dissolved molecular species obtained by the monitoring system 400 over a specific time period;
2) Mathematically analyzing the selected historical measurements to quantify averages, means, variations, trends and/or patterns for one or more specific dissolved molecular species;
3) Deriving recommended new alert thresholds corresponding to one or more specific dissolved molecular species; based on specific behaviors of the piece of electrical equipment 4, as conveyed by the historical measurements;
4) Modifying the alert thresholds based on the newly derived new alert thresholds automatically or with user involvement/approval so that they are used going forward by the processing system 300; and
5) Repeatedly adapting the alert thresholds over time based on newly obtained historical measurements conveying concentrations of dissolved molecular species.

In embodiments in which the processing system 300 receives measurements from different piece of electrical equipment 4, it is programmed for performing the threshold adjustment determination process 29 for setting the thresholds 250 of each of the different pieces of electrical equipment 4 at least partly based on the measurement history specific to each respective electrical equipment 4. As a results, corresponding alert thresholds of the different pieces of electrical equipment 4 may be set at different levels and/or rates of change.

Practical Example of Implementation for the Processing System 300

Those skilled in the art should appreciate that in some non-limiting embodiments, all or part of the functionality previously described herein with respect to the processing system 300 for providing the dissolved gas analysis functionality including alert threshold setting and improved monitoring functionalities as described throughout this specification, may be implemented using pre-programmed hardware or firmware elements (e.g., microprocessors, FPGAs, application specific integrated circuits (ASICs), electrically erasable programmable read-only memories (EEPROMs), etc.), or other related components.

In other non-limiting embodiments, all or part of the functionality previously described herein with respect to the processing system 300 may be implemented as software consisting of a series of program instructions for execution by one or more computing units. The series of program instructions can be tangibly stored on one or more tangible computer readable storage media, or the instructions can be tangibly stored remotely but transmittable to the one or more computing unit via a modem or other interface device (e.g., a communications adapter) connected to a computer network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of suitable programming languages for use with many computer architectures or operating systems.

Figure 7:
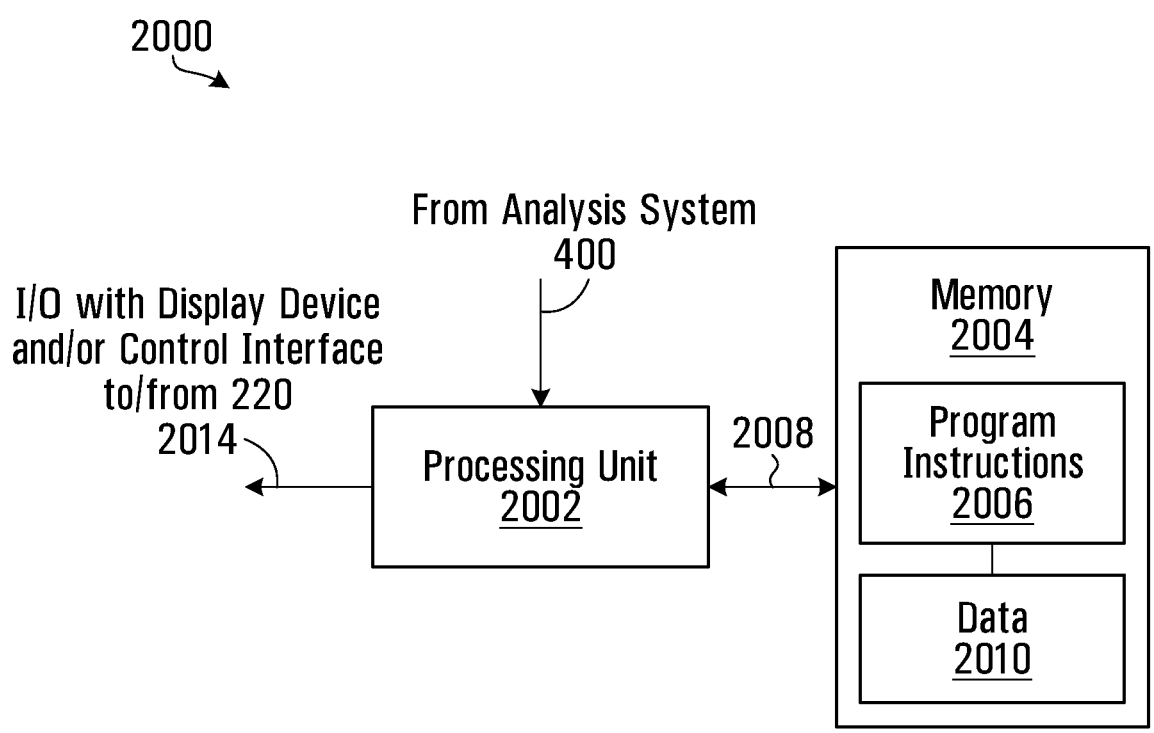
FIG. 7 is a block diagram of the processing system of the monitoring system shown in FIG. 1 in accordance with a specific example of implementation of the disclosure.

In a non-limiting example, some or all the functionality of the processing system 300 may be implemented on a suitable microprocessor 2000 of the type depicted in FIG. 7. Such a microprocessor 2000 typically includes at least one processing unit 2002 and a computer-readable media (e.g., a memory 2004) that is connected by a communication bus 2008. The memory 2004 includes program instructions 2006 and data 2010. The processing unit 2002 is adapted to process the data 2010 and the program instructions 2006 in order to implement the functionality described and depicted in the drawings with reference to the processing system 300.

The microprocessor 2000 may also comprise one or more I/O interfaces for receiving or sending data elements to external modules. In particular, with regard to the processing system 300, the microprocessor 2000 may comprise an I/O interface 2012 with the analysis system 400 and an I/O interface 2014 for exchanging signals with an input/output device (such as an input/output device 220).

General System for Providing DGA Monitoring and Analysis

Figure 8:
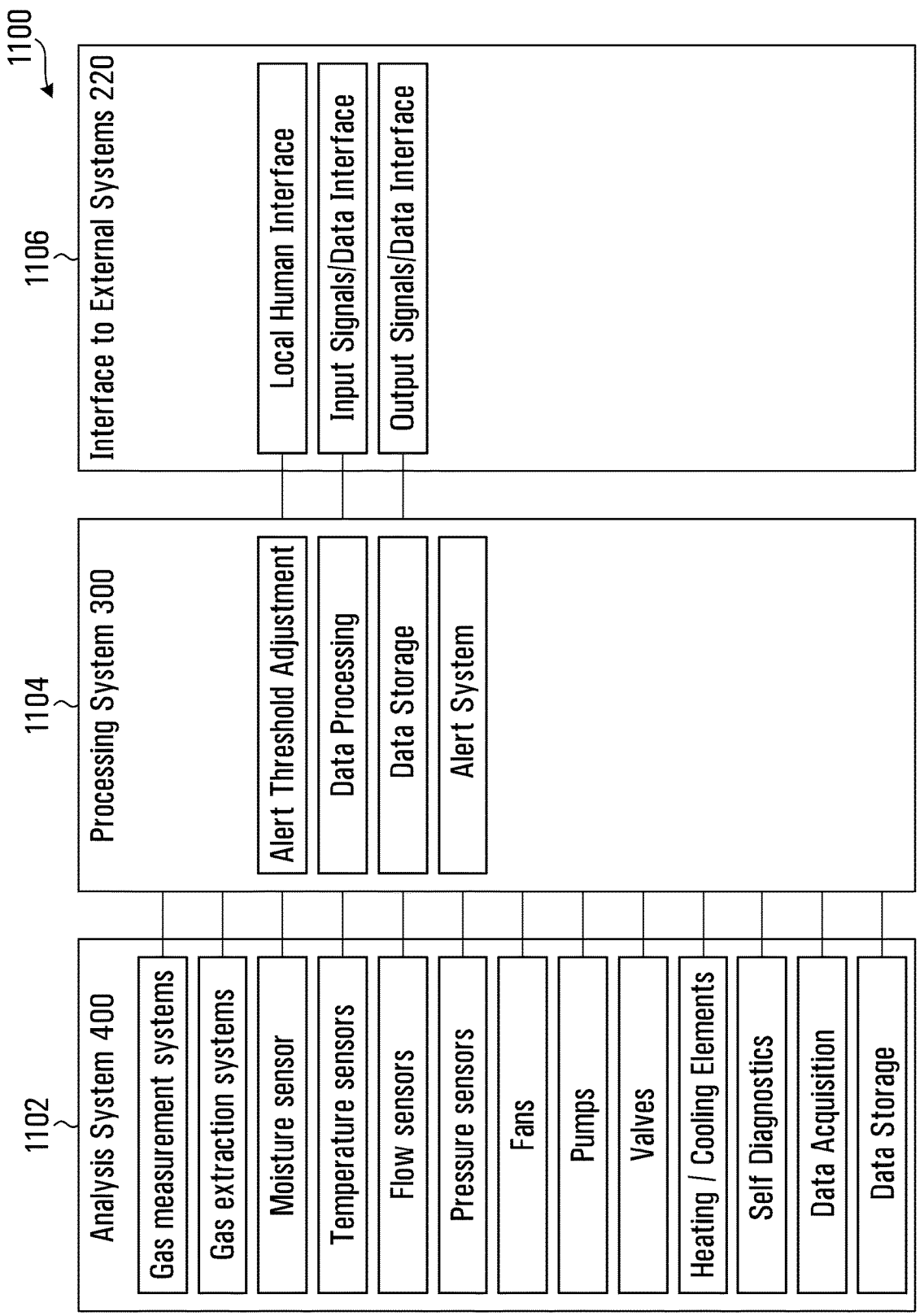
FIG. 8 is a block diagram of an embodiment of the monitoring system including three types of subsystems (internal, processing systems and interfaces to external system) interconnected to one another to provide monitoring and analysis functionality, in accordance with a non-limiting example of implementation of the disclosure.

FIG. 8 is a block diagram of an embodiment of the monitoring system 100 of FIG. 1 including three types of subsystems (internal 1102, processing systems 1104 and interfaces to external system 1106) interconnected to provide DGA monitoring and analysis functionality. The subsystems may have many interconnections and data and control signals flow in both directions between many of them—these have been omitted for the purpose of clarity in the figure.

As depicted, internal subsystems 1102 implement functionality related to the analysis system 400 (shown in FIG. 1) and may include, without being limited to, heating/cooling elements, flow sensors, temperature sensors, moisture sensors, including moisture sensor 150, other (complementary) gas measurement systems, other gas extraction systems, fans, pumps, valves, pressure sensors.

As depicted, subsystems 1104 (which may implement the functionality of processing system 300 described above) may include, without being limited to, data acquisition, data processing, control, self-diagnostics, alert threshold setting and data storage.

In addition, also as depicted, the interface subsystem 1106 may implement functionality related to the user input/output device 220 (shown in FIG. 1) and may include, without being limited to, one or more local human interfaces, input signal/data interfaces, output signal/data interfaces, system maintenance interface and input power interfaces. The human interface may include any suitable display and/or illuminated indicators, and/or buttons and/or touch screen. Input signal/data interfaces may include interfaces for signals from external sensors (e.g., analogue inputs), and/or digital communications to affect the operation of the system. Output signal/data interfaces may include for example logic-level outputs (relays), analogue outputs and/or digital communications. The digital communications may be carried by copper, optical fiber, or wireless media, or any combination thereof. The digital communications may include, without being limited to, the use of Ethernet or Serial communication protocols, and may include the use of industrial communication protocols such as DNP3, Modbus, IEC 61850. The signals being sent/received through these interfaces (local human interfaces, input signal/data interfaces, output signal/data interfaces) may convey (for example but without being limited to) system status, system settings, measured concentrations and rates of change of concentrations of the dissolved gases and moisture, status of dissolved gas and/or moisture levels and rates of change in relation to pre-set thresholds, interpretations of dissolved gas and/or moisture levels based on algorithms adapted to that purpose, and system events. The system maintenance interface may include a digital communication interface to enable firmware updates and settings updates, for example. In addition, the input power interface may in some implementations be configured to monitor power quality, filter the incoming power, control conducted emissions, and protect the system from voltage spikes and power dropouts.

It will be appreciated by the person skilled in the art in view of the present description that the subsystems depicted in FIG. 8 have been shown for the purpose of illustration only and that a detailed description of these subsystems is beyond the scope of the present application and will thus not be described in further detail here.

Training an Artificial Intelligence (AI) Engine

As mentioned above, the new values for the alert thresholds 250 may be set by an artificial intelligence (AI) engine in a manner that concurrently predicts potential malfunctions of the pieces of electrical equipment 4 and reduces false positives (e.g., alert events when there is no malfunction of the pieces of electrical equipment 4).

Figure 9:
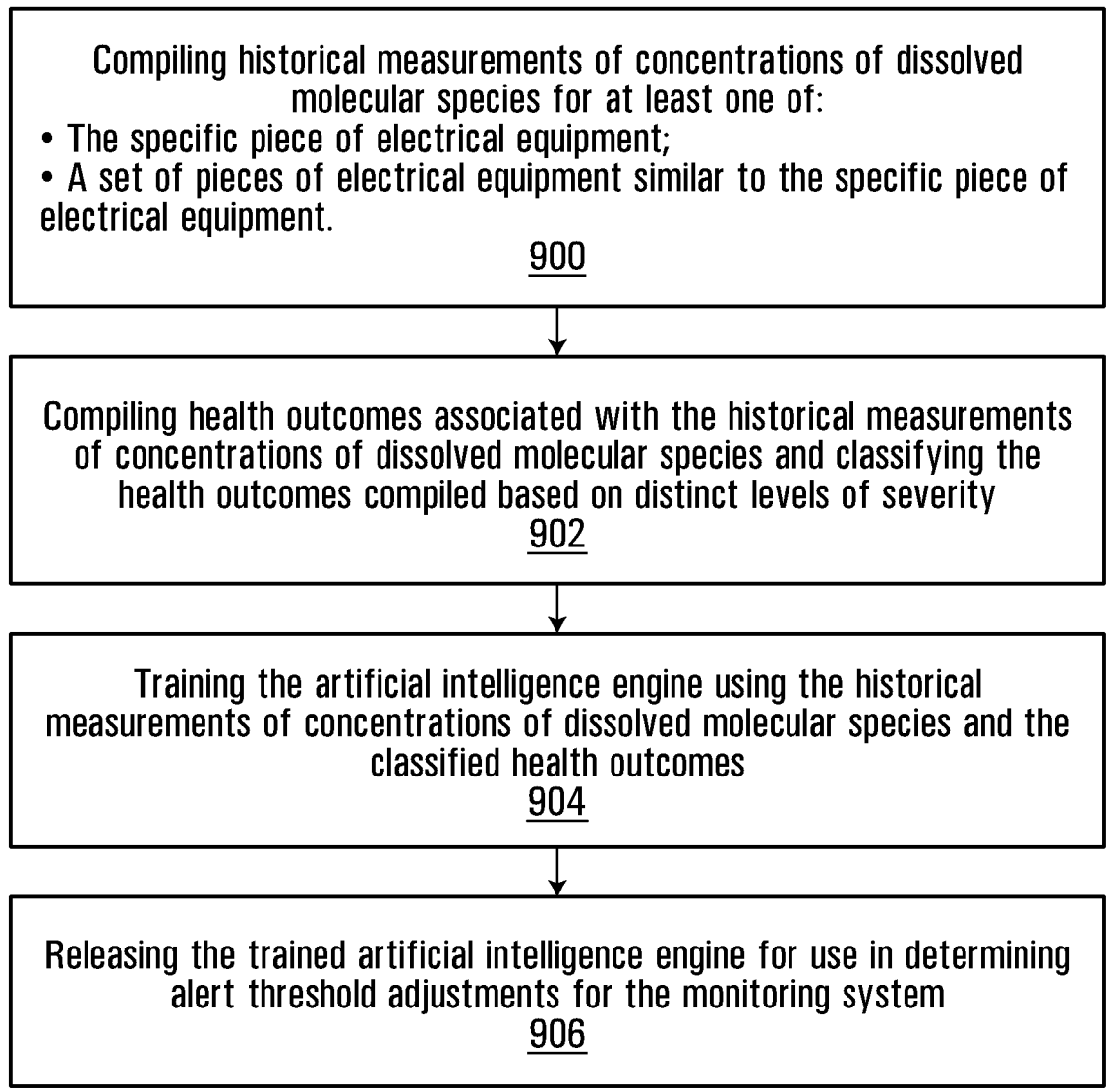
FIG. 9 shows a process for training an artificial intelligence (AI) engine for determining alert threshold adjustments for a monitoring system in accordance with a specific example of implementation.

With reference to FIG. 9, a process for training an artificial intelligence (AI) engine for determining alert threshold adjustments in accordance with a specific example of implementation will now be described.

As depicted, at step 900, historical measurements of concentrations of dissolved molecular species are compiled for at least one of, or both of:
 the specific piece of electrical equipment 4;
 a set of pieces of electrical equipment similar to the specific piece of electrical equipment 4.

At step 902, health outcomes associated with the historical measurements of concentrations of dissolved molecular species are complied and classified based on distinct levels of severity. In accordance with some implementations, at least some of the health outcomes associated with the historical measurements of concentrations of dissolved molecular species may correspond to malfunctions and/or failures of the specific piece of electrical equipment or pieces of electrical equipment in the set of pieces of electrical equipment.

In practical implementations, the historical measurements of concentrations and associated health outcomes used to train the artificial intelligence engine may vary between implementations and may be modulated in accordance with the availability of suitable training data. For example, in some implementations, the specific piece of electrical equipment 4 and each piece of electrical equipment in the set of pieces of electrical equipment may be of a same equipment type. For example, they may all be transformers, all be tap-changers or all be circuit breakers. In addition, in some implementations, both the specific piece of electrical equipment 4 and the pieces of electrical equipment in the set of pieces of electrical equipment may be of a same equipment type and may share one or more, or all, of the following characteristics:
 model number;
 manufacturer;
 year of manufacture;
 type of equipment core;
 type of winding;
 field of use; and/or
 insulating liquid type.

In addition, in practical implementations, the compiled historical measurements of concentrations of dissolved molecular species for pieces of electrical equipment in the set of pieces of electrical equipment may be obtained from a set of monitoring systems similar to the monitoring system 100 used for the specific piece of electrical equipment 4. For example, the monitoring systems in the set of monitoring systems and the monitoring system 100 for the specific piece of electrical equipment 4 may all be of the same type, for example they may all use similar technology to derive measurements of gas concentrations. In some implementations, monitoring systems in the set of monitoring systems and the monitoring system 100 for the specific piece of electrical equipment 4 may also share one or more of the following characteristics:
 model number;
 manufacturer; and/or
 field of use.

It is to be appreciated that, the greater the similarity between the specific piece of electrical equipment 4 and the pieces of electrical equipment in the set of pieces of electrical equipment, and the greater the similarity between the monitoring systems in the set of monitoring systems and the monitoring system 100 for the specific piece of electrical equipment 4, the more representative the trained artificial intelligence engine will be of the predictive behaviour of the specific piece of electrical equipment 4. However, there is a trade-off to be had in cases where the training data available is sparse and therefore some variation between the specific piece of electrical equipment 4 and the pieces of electrical equipment in the set of pieces of electrical equipment (and/or between the monitoring systems in the set of monitoring systems and the monitoring system for the specific piece of electrical equipment) may be acceptable in the interest of increasing the amount of training data available to train the AI engine.

At step 904, the artificial intelligence engine is trained using the historical measurements of concentrations of dissolved molecular species and the classified health outcomes. Any suitable method known in the art may be used here to provide and train a suitable AI engine. Such methods are beyond the scope of the present disclosure and will not be described further here.

At step 906, the trained artificial intelligence engine is released for use in determining alert threshold adjustments for the monitoring system of the specific piece of electrical equipment 4 in a manner that concurrently predicts potential malfunctions of the pieces of electrical equipment 4 and reduces false positives (e.g., alert events when there is no malfunction of the pieces of electrical equipment 4).

Although in the embodiments described above the analysis system 400 includes a DGA system, in some embodiments, the analysis system 400 may instead, or in addition, include another type of analysis apparatus configured for obtaining measurements conveying concentrations of dissolved molecular species in the electrical insulating liquid.

Note that titles or subtitles may be used throughout the present disclosure for convenience of a reader, but in no way should these limit the scope of the disclosure. Moreover, certain theories may be proposed and disclosed herein; however, in no way they, whether they are right or wrong, should limit the scope of the disclosure so long as the disclosure is practiced according to the present disclosure without regard for any particular theory or scheme of action.

All references and documents cited throughout the specification are hereby incorporated by reference in their entirety for all purposes.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this disclosure pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the disclosure have been described and illustrated, it will be apparent to those skilled in the art in light of the present description that numerous modifications and variations can be made. The scope of the disclosure is defined more particularly in the appended claims.

What is claimed is:

1. A monitoring system for a piece of electrical equipment having components immersed in electrical insulating liquid, the monitoring system including alert threshold determination capabilities, said monitoring system comprising:
   an analysis system configured for obtaining measurements conveying concentrations of dissolved molecular species in the electrical insulating liquid;
   a processing system programmed for:
      processing the measurements conveying concentrations of dissolved molecular species and one or more alert thresholds to determine if a predetermined condition corresponding to the one or more alert thresholds is met;
      causing an alert event in response to the predetermined condition being met; and
      performing a threshold adjustment determination process to derive new values for the one or more alert thresholds at least in part by processing historical measurements of concentrations of dissolved molecular species, including:
         processing a set of the historical measurements of the concentrations corresponding to a specific dissolved molecular species to derive an average concentration associated with the specific dissolved molecular species; and
         using results of said processing to derive the new values for the one or more alert thresholds.

2. The monitoring system of claim 1, wherein said processing system is further programmed for, in response to the new values being derived, adjusting the one or more alert thresholds without human intervention at least in part using the new values for the one or more alert thresholds.

3. The monitoring system of claim 1, wherein said processing system is further programmed for, in response to the new values being derived, presenting the new values for the one or more alert thresholds on a display device associated to a human operator, the new values being presented as suggested adjustments to be made to the one or more alert thresholds.

4. The monitoring system of claim 3, wherein said processing system is further programmed for presenting the user with a user activable input on the display device enabling the human operator to adjust the one or more alert thresholds at least in part using the derived new values for the one or more alert thresholds.

5. The monitoring system of claim 1, wherein the analysis system comprises a gas extraction system configured for extracting gas samples from the electrical insulating liquid and wherein the analysis system comprises a measurement system configured to obtain the measurements from the samples.

6. The monitoring system of claim 1, wherein the dissolved molecular species comprise one or more specific dissolved gases, and the concentrations are respective dissolved gas concentrations of the one or more specific gases, wherein the one or more specific dissolved gases includes at least one of: $H_2$, $CO$, $CH_4$, $C_2H_2$, $C_2H_4$, $C_2H_6$, $CO_2$, $O_2$, $N_2$ and $H_2O$.

7. The monitoring system of claim 1, wherein: the one or more alert thresholds are associated with one or more specific ones of the dissolved molecular species; and said processing system is programmed to derive the new values at least in part by processing the historical measurements of the one or more specific ones of the dissolved molecular species.

8. The monitoring system of claim 1, wherein the one or more alert thresholds convey at least one of a specific concentration level corresponding to a specific dissolved molecular species and a specific rate of change of a concentration level.

9. The monitoring system of claim 1, wherein the one or more alert thresholds are associated with alert levels defining distinct levels of severity for the piece of electrical equipment.

10. The monitoring system of claim 9, wherein the alert level is a first alert level amongst a set of two or more alert levels, each alert level corresponding to a distinct level of severity, one or more respective alert thresholds corresponding to each alert level in said set of alert levels, for each alert level in the set of alert levels, said processing system being programmed for performing the threshold adjustment determination process.

11. The monitoring system of claim 1, wherein the historical measurements of the concentrations include data covering at least 30 days.

12. The monitoring system of claim 1, wherein the analysis system is configured for obtaining the measurements periodically to obtain a sequence of measurements over time and wherein the processing system is programmed for periodically performing the threshold adjustment determination process.

13. The monitoring system of claim 1, wherein the predetermined condition includes any one of: (i) at least one of the measurements exceeding the one or more alert thresholds; (ii) a consecutive number of measurements exceeding the one or more alert thresholds; and (iii) at least one of the measurements exceeding the one or more alert thresholds consecutively for a predetermined period of time.

14. The monitoring system of claim 1, wherein performing the threshold adjustment determination process to derive the new values for the one or more alert thresholds at least in part by processing the historical measurements of concentrations of dissolved molecular species further includes:
   deriving a specific new value for a specific alert threshold corresponding to the specific dissolved molecular species, the specific new value being set to correspond to a weighted amount of the average concentration, the weighted amount being greater than the average concentration.

15. The monitoring system of claim 1, wherein performing the threshold adjustment determination process to derive the new values for the one or more alert thresholds at least in part by processing the historical measurements of concentrations of dissolved molecular species further includes:
deriving a specific new value for a specific alert threshold corresponding to the specific dissolved molecular species, the specific new value being set to exceed the derived average concentration corresponding to the specific dissolved molecular species by at least 10 ppm.

16. The monitoring system of claim 1, wherein the processing system is programmed for performing a suitability process to determine whether the historical measurements are suitable for performing the threshold adjustment determination process, wherein the suitability process includes evaluating at least one of: (i) a number of historical measurements; (ii) a time period of the historical measurements; and (iii) a variability of the historical measurements.

17. The monitoring system of claim 1, wherein the processing system is programmed for performing the threshold adjustment determination process in response to receipt of a command provided through an input device by a user of the monitoring system.

18. The monitoring system of claim 1, wherein causing the alert event comprises conveying information to a communication device associated with a user, the information conveying at least one of: (i) an alert level; (ii) an identification of the one or more thresholds that were exceeded; and (iii) the at least some of the measurements that exceed the one or more alert thresholds.

19. The monitoring system of claim 1, wherein the electrical insulating liquid comprises liquids based on at least one of mineral oil, silicone, natural ester and synthetic ester.

20. The monitoring system of claim 1, wherein the piece of electrical equipment is a transformer.

21. The monitoring system of claim 1, wherein the processing system includes a trained artificial intelligence engine configured for processing the historical measurements of concentrations of dissolved molecular species to derive the new values for the one or more alert thresholds.

22. A method for determining alert threshold adjustments for a monitoring system for a piece of electrical equipment having components immersed in electrical insulating liquid, the piece of electrical equipment being one piece of electrical equipment in a set of pieces of electrical equipment, the monitoring system being configured for obtaining measurements conveying concentrations of dissolved molecular species in the electrical insulating liquid, the monitoring system being configured for causing an alert event in response to a predetermined condition being met, the method comprising:
compiling the measurements conveying concentrations of dissolved molecular species in the electrical insulating liquid to obtain historical measurements of concentrations of dissolved molecular species;
performing a threshold adjustment determination process to derive new values for one or more alert thresholds, the threshold adjustment determination process being performed at least in part by:
processing the historical measurements of concentrations of dissolved molecular species including processing a set of historical measurements of concentrations corresponding to a specific dissolved molecular species to derive an average concentration corresponding to the specific dissolved molecular species; and
using results of said processing to derive the new values for the one or more alert thresholds;
in response to the new values for the one or more alert thresholds being derived, performing at least one of the following:
adapting the one or more alert thresholds without human intervention at least in part using the derived new values for the one or more alert thresholds;
presenting the derived new values for the one or more alert thresholds on a display device associated to a human operator, the new values being presented as suggested adjustments to be made to the one or more alert thresholds.

23. The method of claim 22, further comprising, in response to the new values for the one or more alert thresholds being derived, presenting the derived new values for the one or more alert thresholds on a display device associated to a human operator, the new values being presented as suggested adjustments to be made to the one or more alert thresholds.

24. The method of claim 23, further comprising presenting the user with a user activable input on the display device in conjunction with the new values for the one or more alert thresholds, the activable input enabling the human operator to adapt the one or more alert thresholds at least in part using the derived new values for the one or more alert thresholds.

25. The method of claim 24, wherein the historical measurements are specific to the one piece of electrical equipment in the set of pieces of electrical equipment.

26. The method of claim 22, wherein processing the historical measurements of concentrations and using results of said processing to derive the new values for the one or more alert thresholds further includes:
deriving a specific new value for a specific alert threshold corresponding to the specific dissolved molecular species, the specific new value being set to correspond to a weighted amount of the derived average concentration corresponding to the specific dissolved molecular species, the weighted amount being greater than the derived average concentration.

27. The method of claim 22, further comprising periodically performing the threshold adjustment determination process, the threshold adjustment determination process being performed at least once per year.

28. The method of claim 22, further comprising performing the threshold adjustment determination process in response to receipt of a command provided through an input device by a user.

29. The method of claim 22, wherein performing the threshold adjustment determination includes using a trained artificial intelligence engine for processing the historical measurements of concentrations of dissolved molecular species to derive the new values for the one or more alert thresholds.

30. A non-transitory computer-readable medium comprising program instructions, the instructions being configured to be executed by one or more processors of a processing system for performing a threshold adjustment determination process and for adjusting alert thresholds at least in part by processing historical concentration measurements in an electrical insulating liquid of a piece of electrical equipment including processing a set of historical measurements of concentrations corresponding to a specific dissolved molecular species to derive an average concentration corresponding to the specific dissolved molecular species; and using results of said processing to derive new values for the alert thresholds.

31. An electrical substation comprising:
a plurality of pieces of electrical equipment having components immersed in electrical insulating liquid, the plurality of pieces of electrical equipment including two or more pieces of electrical equipment, each piece of electrical equipment having an analysis system connected thereto configured for obtaining measurements conveying concentrations of dissolved molecular species in the electrical insulating liquid; and
a processing system in communication with the plurality of pieces of electrical equipment, said processing system being configured for:
processing the measurements conveying concentrations of dissolved molecular species and one or more alert thresholds to determine if a predetermined condition corresponding to the one or more alert thresholds is met;
causing an alert event in response to the predetermined condition being met; and
performing a threshold adjustment determination process to derive new values for the one or more alert thresholds corresponding to an alert level for each piece of electrical equipment independently, the threshold adjustment determination process being performed at least in part by processing historical measurements of concentrations in the electrical insulating liquid for each piece of electrical equipment independently, wherein performing the threshold adjustment determination process for a specific piece of electrical equipment includes:
processing for the specific piece of electrical equipment a set of the historical measurements of the concentrations corresponding to a specific dissolved molecular species to derive an average concentration associated with the specific dissolved molecular species; and
using results of said processing to derive the new values for the one or more alert thresholds for the specific piece of electrical equipment.

32. A method for training an artificial intelligence engine for determining alert threshold adjustments for a specific monitoring system for a specific piece of electrical equipment having components immersed in electrical insulating liquid, the monitoring system being configured for obtaining measurements conveying concentrations of dissolved molecular species in the electrical insulating liquid, the monitoring system being configured for causing an alert event in response to a predetermined condition being met, the method comprising:
compiling historical measurements of concentrations of dissolved molecular species for at least one of:
the specific piece of electrical equipment;
a set of pieces of electrical equipment including the specific piece of electrical equipment;
compiling health outcomes associated with the historical measurements of concentrations of dissolved molecular species and classifying the health outcomes compiled based on distinct levels of severity;
training the artificial intelligence engine using the historical measurements of concentrations of dissolved molecular species and the classified health outcomes;
releasing the trained artificial intelligence engine for use in determining alert threshold adjustments for the monitoring system,
wherein training the artificial intelligence engine includes:
processing a set of the historical measurements of the concentrations corresponding to a specific dissolved molecular species to derive an average concentration associated with the specific dissolved molecular species; and
using results of said processing to derive the alert threshold adjustments.

33. The method of claim 32, wherein at least some of the health outcomes associated with the historical measurements of concentrations of dissolved molecular species correspond to malfunctions of the specific piece of electrical equipment or of pieces of electrical equipment in the set of pieces of electrical equipment.

34. The method of claim 32, wherein:
the specific piece of electrical equipment is of a first equipment type, wherein the first equipment type is one of a transformer, a tap-changer and a circuit breaker; and
each piece of electrical equipment in the set of pieces of electrical equipment is of an equipment type that corresponds to the first equipment type.

35. The method of claim 34, wherein the specific piece of electrical equipment and each piece of electrical equipment in the set of pieces of electrical equipment share at least one of the following characteristics:
model number;
manufacturer;
year of manufacture;
type of equipment core;
type of winding;
field of use; and
insulating liquid type.

36. The method of claim 32, wherein:
the monitoring system for the specific piece of electrical equipment corresponds to a first specific type of monitoring system; and
the compiled historical measurements of concentrations of dissolved molecular species for the set of pieces of electrical equipment are obtained from a set of monitoring systems, each monitoring system in the set of monitoring systems being of the first specific type of monitoring system.

37. The method of claim 36, wherein monitoring systems in the set of monitoring systems and the monitoring system for the specific piece of electrical equipment may share at least one of the following characteristics:
model number;
manufacturer; and
field of use.

\* \* \* \* \*